United States Patent Office 3,326,108
Patented June 20, 1967

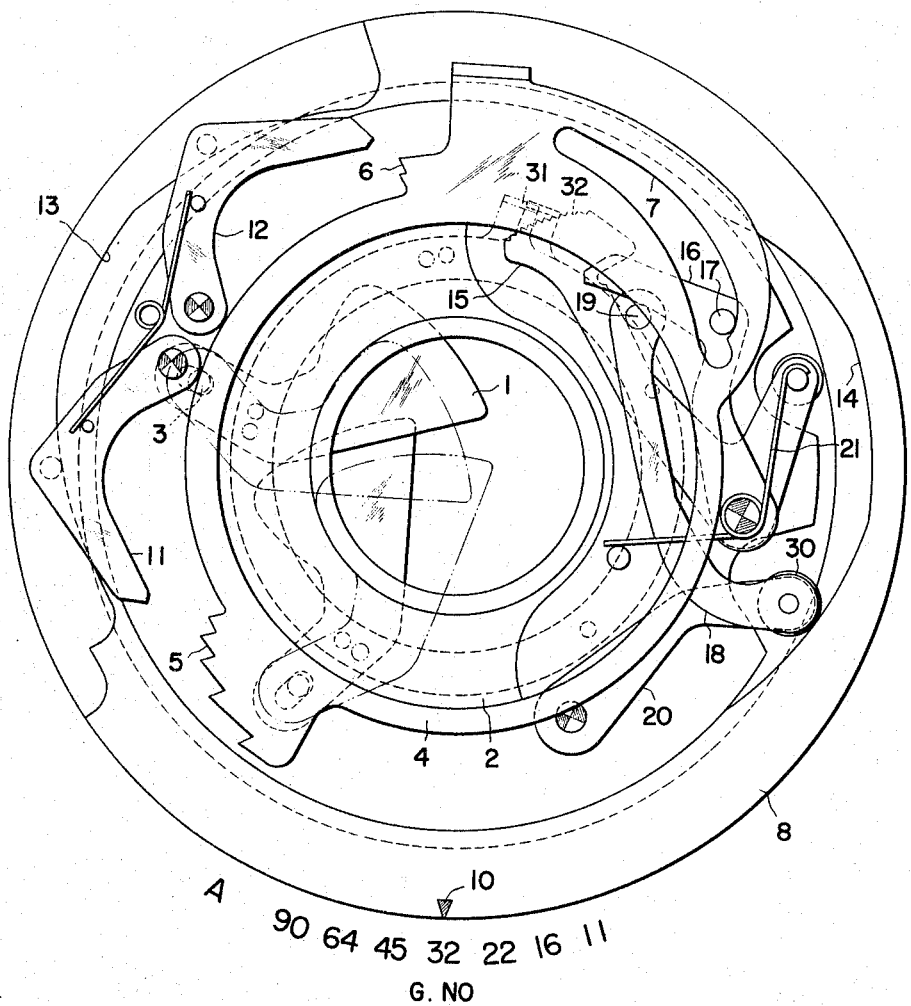

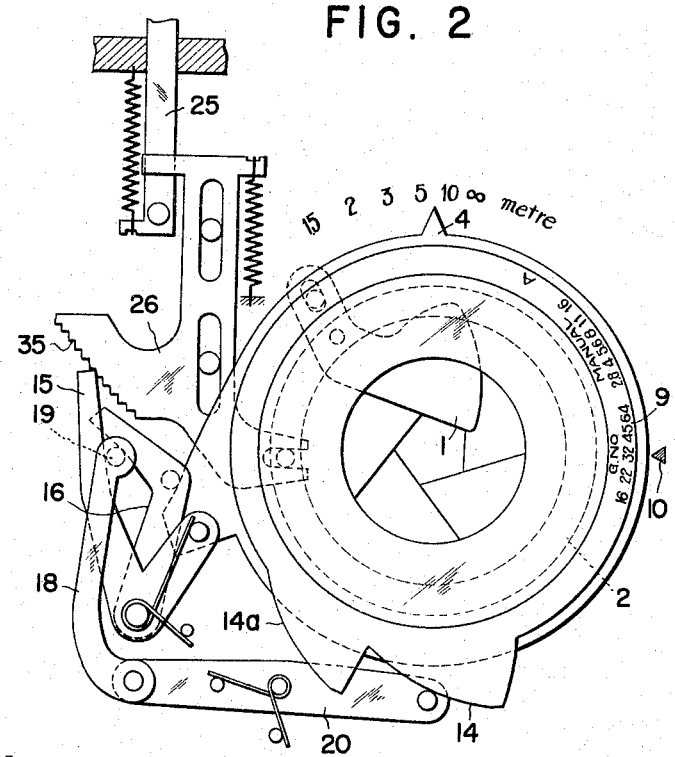
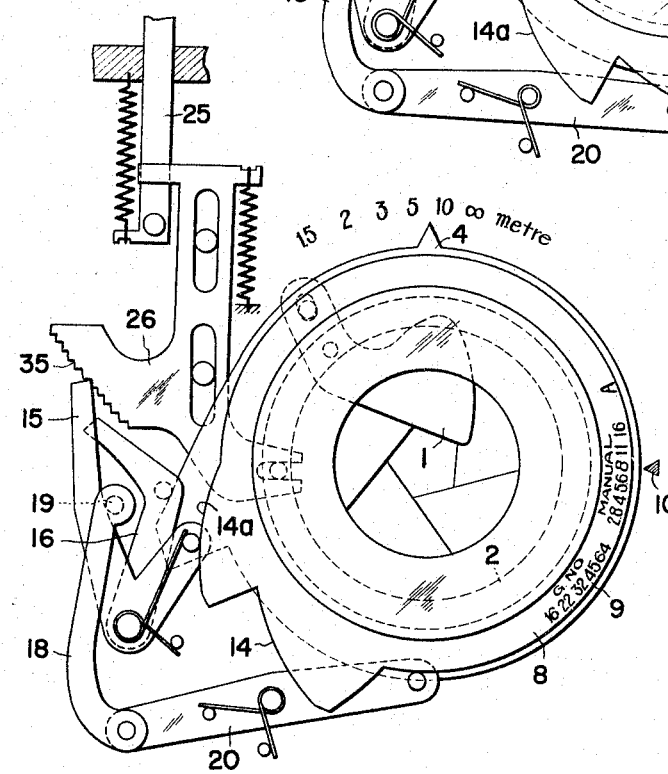

3,326,108
AUTOMATIC EXPOSURE CONTROL DEVICE FOR FLASHLIGHT PHOTOGRAPHING
Kiyoshi Kitai, Shinjuku-ku, Tokyo-to, Japan, assignor to Kabushiki Kaisha Hattori Tokeiten, Tokyo-to, Japan, a joint-stock company of Japan
Filed Dec. 31, 1964, Ser. No. 422,596
Claims priority, application Japan, Jan. 9, 1964, 39/592
7 Claims. (Cl. 95—64)

ABSTRACT OF THE DISCLOSURE

In a photographic camera, mechanism for automatically adjusting the diaphragm in accordance with distance and guide number settings comprises a first lever controlled by a cam on a guide number ring, a second lever pivotally mounted on the first, a third lever controlled by a cam on a distance ring and a fourth lever which is controlled by the joint action of the second and third lever. The fourth lever has a portion engageable by a diaphragm adjusting member so that the amount the diaphragm opens when a picture is taken depends on the position of the fourth lever. A pair of levers and cooperating stepped surfaces are also provided for limiting movement of the distance ring according to the setting of the guide number ring. Preferably means is provided for limiting movement of the distance ring according to the setting of the guide number ring. In one embodiment, provision is also made for manual adjustment of the diaphragm.

This invention relates to an automatic exposure control apparatus useful for taking photographs with flashlights and has as one of its objects to provide an improved mechanism which can be set either for automatic exposure control at the time of taking photographs with flashlights or for manual exposure control.

According to this invention a cam is provided for a focus adjusting member of a member cooperating therewith, whereby a plurality of levers are arranged to operate as a function of the distance to an object to be photographed, thereby to set an exposure control member. Further, by varying the selected guide number, the phases of said levers are shifted to correct the exposure control member.

Stepped portions for limiting the distance are provided for the focus adjusting member or for a member cooperating therewith, thereby to automatically limit the distance to the object dependent upon the selected guide number by the limiting action of a stopper which is interlocked with the guide number changing member.

It is also a feature of this invention to provide a manual stop selecting feature without increasing the number of component parts.

Another advantage of this invention, is that, as it is possible to provide a uniform or equidistance guide number scale, relations between various exposure factors such as sensitivity of films multiplication factor of filters, shutter speed and the like can be advantageously indicated.

While the specification concludes with claims particularly pointing out and distinctly claiming the subject matter of the invention, it is believed that the invention will be better understood from the following description taken in combination with the accompanying drawings, in which:

FIG. 1 is a front elevation of an automatic exposure control device or mechanism embodying this invention; and FIGS. 2 and 3 show front views of a modified mechanism at different operating states thereof.

Referring now to FIG. 1 of the accompanying drawing the automatic exposure control mechanism embodying the principle of this invention comprises diaphragm adjusting blades 1 as an iris type diaphragm the blades of which are loosely connected to a diaphragm ring 2 by means of lost motion connections consisting of pivot pins 3 and elongated slots so as to be pivotable around the pivot pins 3 to vary the size of the diaphragm opening by the rotary motion of the stop ring 2. A distance ring 4 adapted to adjust focusing in relation to a helicoid and the like connected to a camera is provided, said ring including a short distance stepped portion 5 and a long distance stepped portion 6, and is provided with a cam 7 at one portion thereof.

A guide number ring 8 is marked with an index 10 which cooperates with a selected one of a plurality of guide numbers 9 and a camera auto-position A. A cam surface 13 of this ring cooperates with pins carried by stoppers 11 and 12 mounted to pivot around fixed pivots thereby to cause said stoppers to cooperate with said stepped portions 5 and 6, respectively, of said distance ring 4. The ring 8 is further provided with another cam surface 14 which cooperates with the first, second and fourth levers to be described later.

The fourth lever 15 is pivoted on a fixed pin and is provided with a stepped portion at its free end which cooperates with a projection mounted on the diaphragm ring 2 to adjust the angle of rotation thereof. The third lever 16 is mounted on the same pivot pin as the fourth lever 15 and is provided with a pin that cooperates with a cam 7 provided for the distance ring 4. The second lever 18 has a roller 30 at one end thereof which cooperates with a cam surface 14 formed on the inner side of the guide number ring 8 and a pin 19 at its opposite end which is sandwiched between the fourth lever 15 and the third lever 16. One end of the first lever 20 is also pivoted around a fixed pin, and the opposite end thereof is connected to the second lever 18 to form a link mechanism. A spring 21 is provided to urge the fourth lever 15 in the clockwise direction. Accordingly the positions of the second lever 18, third lever 16 and the fourth lever 15 are determined by the cam 7 of the distance ring 4 and the cam 14 of the guide number ring 8.

The principle of operation of the mechanism described above is as follows:

FIG. 1 shows a state wherein the setting of the index 10 on the guide number ring 8 has been changed from the auto-position A to guide number 32. During this setting the cam surface 14 rotates the first lever 20 in the counter clockwise direction. By this rotational movement the pin 19 carried by the second lever 18 slides along the third lever 16. As a result the fourth lever 15 is pushed by the pin 19 to bring its stepped portion into the locus of rotation of the diaphragm ring 2. On the other hand, when the distance is adjusted, the cam surface 7 of the distance ring actuates the third lever 16 through a pin 17. As a result the third lever 16 adjusts the stepped portion of the fourth lever to the position indicated in the drawing through the pin 19 of the second lever.

The projection 31 on the diaphragm ring 2 is normally held in a position shown by dotted lines, but as the ring 2 is rotated it engages and is locked by the stepped portion 32 of the fourth lever 15 to determine the angle. As a result, the diaphragm adjusting blades 1 which were in the closed position as indicated by dot and dash lines are brought to the position indicated by solid lines by a well known release mechanism to automatically set a suitable amount of diaphragm aperture corresponding to the distance to the object and the selected guide number.

When it is desired to select a different guide number, the guide number ring 8 is rotated to the right or left from the position indicated in FIG. 1. At the same time the cam surface 13 of the guide number ring 8 is also moved to very the positions of pointed tips of the stop levers 11 and 12 with respect to stepped portions 5 and 6, respectively, of the distance ring 4, the degree of rotation thereof being limited by the between stoppers 11 and 12 and the respective stepped portions 5 and 6, thus automatically adjusting the distance to the object.

FIGS. 2 and 3 illustrate the invention as applied to a camera wherein the same or corresponding components are represented by the same reference numerals. In this embodiment the configuration of the cam 14 shown in FIG. 1 is modified to have an automatic cam section 14 and a manual cam section 14a so that manual stop adjustment may be made. As shown the diaphragm control member 26 is formed with a stepped portion 35 which is arranged to cooperate with the fourth lever 15. A release button 25 is associated with the diaphragm control member 26.

When the manual stop is utilized the second lever 18 is displaced to a position not to transmit the movement of the third lever 16 to the fourth lever 15, and the degree of movement of the fourth lever 15 which is related to the stepped portion of the stop control member 26 is controlled by the manual stop cam section 14a of the guide number ring 8.

FIG. 2 shows the camera set for taking a photograph by flashlight whereas FIG. 3 shows the state of camera set for manual stop.

While the invention has been explained by describing particular embodiments thereof, it will be apparent that improvements and modifications may be made therein without departing from the scope of the invention as defined in the appended claims.

What I claim is:

1. In a photographic camera, an automatic diaphragm adjusting mechanism comprising a flash guide number ring which is manually settable to select a guide number, said guide number ring having a first cam provided thereon, a distance ring which is manually settable to select a distance, said distance ring having a second cam provided thereon, a first lever swingable about a stationary pivot and having a cam follower portion engaging said first cam whereby the position of said first lever is adjustable by said guide number ring, a second lever swingable about a pivot on said first lever, a third lever swingable about a stationary pivot and having a cam follower portion engaging said second cam whereby the position of said third lever is adjustable by said distance ring, a fourth lever swingable about a pivot and operably connected with said second and third levers whereby the position of said fourth lever is adjustable according to the positions of said second and third levers and a diaphragm adjusting member having a portion engageable with said fourth lever to limit movement of said diaphragm adjusting member according to the position of said fourth lever.

2. Mechanism according to claim 1, in which said fourth lever has a stepped surface engageable by said diaphragm adjusting member to limit movement of said member.

3. Mechanism according to claim 1, in which said guide number ring has third and fourth cam surfaces and said distance ring has first and second limiting steps, and in which a first stop lever controlled by said third cam surface is engageable with said first limiting steps to limit movement of the distance ring in one direction and a second stop lever controlled by said fourth cam surface is engageable with said second limiting steps to limit movement of the distance ring in the other direction.

4. Mechanism according to claim 1, in which said guide number ring is movable to disengage said first cam surface from said first lever, and has a further cam surface acting on said fourth lever to set said fourth lever manually in selected position according to the position of said guide number ring to provide manual control of said diaphragm.

5. Mechanism according to claim 1, in which said third and fourth levers are swingable about the same pivotal axis.

6. Mechanism according to claim 5, in which a connecting member carried by said second lever is engageable between portions of said third and fourth levers so that the position of said fourth lever is determined jointly by the positions of said second and third levers.

7. Mechanism according to claim 6, in which said fourth lever is movable in one direction by said second and third levers, and in which spring means acts on said fourth lever to move it in the opposite direction and acts through said fourth lever, said connecting member and said second lever to bias said cam follower portions of said first and third levers toward said first and second cams respectively.

References Cited
UNITED STATES PATENTS 3,075,442  1/1963  Koppen et al. _____ 95—10
3,129,647  4/1964  Koppen et al. _____ 95—10

NORTON ANSHER, *Primary Examiner.*

J. F. PETERS, *Assistant Examiner.*